United States Patent
Knappe

(10) Patent No.: US 8,413,415 B2
(45) Date of Patent: Apr. 9, 2013

(54) METHOD AND DEVICE FOR PRODUCING A THREAD MADE FROM A PLURALITY OF INDIVIDUAL FILAMENTS AND MONOFILAMENT THREAD PRODUCED THROUGH THE METHOD

(75) Inventor: Faisal Knappe, Zeil am Main (DE)

(73) Assignee: Falsal Knappe, Zeil am Main (DE)

( * ) Notice: Subject to any disclaimer, the term of this patent is extended or adjusted under 35 U.S.C. 154(b) by 0 days.

(21) Appl. No.: 13/373,136

(22) Filed: Nov. 4, 2011

(65) Prior Publication Data

US 2012/0144795 A1    Jun. 14, 2012

Related U.S. Application Data

(63) Continuation of application No. PCT/EP2010/056038, filed on May 4, 2010.

(30) Foreign Application Priority Data

May 4, 2009   (DE) .......................... 10 2009 019 500
Jul. 29, 2009  (DE) .......................... 10 2009 061 031

(51) Int. Cl.
    *D02G 3/36* (2006.01)
(52) U.S. Cl.
    USPC ............................................................ 57/7
(58) Field of Classification Search .................... 57/232, 57/244, 249, 250, 258, 7, 311
    See application file for complete search history.

(56) References Cited

U.S. PATENT DOCUMENTS

| | | | | |
|---|---|---|---|---|
| 4,084,399 A * | 4/1978 | Kanemaru et al. | .............. | 57/232 |
| 4,419,400 A | 12/1983 | Hindersinn | | |
| 4,473,936 A * | 10/1984 | Kellner et al. | .................. | 29/458 |
| 4,870,814 A * | 10/1989 | Chacko et al. | .................. | 57/217 |
| 6,062,014 A * | 5/2000 | Yeh | ................. | 57/232 |
| 6,221,293 B1 * | 4/2001 | Brussel et al. | ................ | 264/136 |
| 7,617,667 B2 * | 11/2009 | Jerome, Jr. | ...................... | 57/229 |
| 2005/0160714 A1 * | 7/2005 | Delvael | ........................... | 57/232 |
| 2011/0005187 A1 * | 1/2011 | Chung et al. | ................... | 57/232 |

FOREIGN PATENT DOCUMENTS

EP    1094042 A1    4/2001
GB    2 012623 A    8/1979

* cited by examiner

*Primary Examiner* — Shaun R Hurley
(74) *Attorney, Agent, or Firm* — Von Rohrscheidt Patents

(57) ABSTRACT

The method for producing a thread which includes a plurality of individual filaments individually supported at a distance from one another and coated with a flowable resin which includes a solvent and can be crosslinked under the effect of at least one physical variable and/or one chemical substance. The coated individual filaments are subsequently compacted so that a composite is formed which includes the individual filaments and the resin continuously surrounding them and which is free of gas pockets. The solvent included in the resin is expelled from the composite during a drying process. Subsequently, the composite, presently a monofilament thread, is wound up in a non-crosslinked state of the resin. All individual filaments are aligned unidirectionally during all steps of the method. The invention further relates to a device to perform the method and a monofilament thread produced with the device.

20 Claims, 4 Drawing Sheets

006# METHOD AND DEVICE FOR PRODUCING A THREAD MADE FROM A PLURALITY OF INDIVIDUAL FILAMENTS AND MONOFILAMENT THREAD PRODUCED THROUGH THE METHOD

RELATED APPLICATIONS

This application is a continuation of International application PCT/EP2010/056038 filed on May 4, 2010 claiming priority from German application DE 10 2009 019 500.9 filed on May 4, 2009 and German application DE 10 2009 061 031.6 filed on Jul. 29, 2009. All the above applications are incorporated in their entirety by this reference.

FIELD OF THE INVENTION

The invention relates to a method for producing a thread which includes a plurality of individual filaments. The invention furthermore relates to a method for producing a thread which includes a plurality of individual filaments. The invention also relates to a thread which includes a plurality of individual filaments and which is produced according to the method according to the invention or through a device according to the invention.

BACKGROUND OF THE INVENTION

Methods and devices for producing threads (yarns) including a plurality of individual filaments and threads of this type are well known in the art. In order to improve strength and cohesion of the individual filaments, which are monofilaments as defined in the instant application, in the finished thread, in particular when the individual filaments are staple fibers, this means filaments with relatively small length, the individual filaments are twisted with one another through a spinning method. As an alternative to twisting, individual filaments can also be glued together using curing or curable resins in order to achieve a composite with sufficient cohesion. Threads of this type with a resin component are designated as fiber composite materials.

It is a disadvantage of the known threads that textile fabrics produced therefrom through further processing (woven materials, knitted materials, laid tapes, fleeces or similar) or in turn semi-finished products (profiles, plates, bars or similar) made from these textile fabrics through further processing can only be computed with difficulty with respect to their static and dynamic properties. In particular, the finite element method (FEM) fails for structures made from threads, wherein the finite element method provides a rather precise numeric determination of loads in a component in wide fields of solid object statics with the large computing capacities available today.

Furthermore, a disadvantage of known composite materials including threads and resins providing cohesion for the threads is that the resin portion is rather high. This does not only reduce the strength of such composite materials but also increases cost since the resins are comparatively expensive. Furthermore, using large amounts of resins is also critical from an environment point of view or under the aspect of saving resources, since the resins are typically made from crude oil products.

BRIEF SUMMARY OF THE INVENTION

Thus it is an object of the invention to provide a method and a device for producing a filament through which threads (yarns) can be produced which are configured to be finished into textile fabrics which in turn are characterized by high strength, simple numerical computability of the mechanical loads and through low resin consumption.

The object is achieved by a method, wherein individual filaments are respectively supported endless and offset from one another and coated with a flowable resin including a solvent and crosslinkable under an impact of at least one physical variable and/or a chemical substance, wherein the coated individual filaments are subsequently compacted, so that a composite is formed which includes individual filaments and continuous resin enveloping the individual filaments, wherein the composite is free from any gas enclosures, wherein the solvent is subsequently expelled from the composite including resin during a drying process, wherein the composite provided as monofilament thread is wound up in a state where the resin is not crosslinked, wherein all individual filaments are supported in parallel orientation (this means unidirectionally) during all preceding process steps.

The invention is based on the finding that twisting the individual filaments of a thread as used as a standard in the art is very disadvantageous when the twisted thread shall be finished into a textile fabric in additional process steps to form a component of a subsequent resin-including composite material and additional semi-finished products shall be produced therefrom through adding resin. Twisting the individual filaments namely is very detrimental for a subsequent connection of a plurality of threads using a flowable resin to form a fiber composite material, since a penetration of the resin into the central portions about the longitudinal axis of the thread is almost excluded, since the twisted individual filaments close the inner portion quasi gas tight and shield it against a penetration of the resin. This causes a loss of strength loss for the thread, since the thread does not have sufficient cohesion in its interior due to the lacking resin.

This problem is solved through the method according to the invention through coating the individual filaments already and subsequently compacting them which provides a composite which only includes the individual filaments and the resin enveloping them over the entire cross-section. Through a suitable compacting method, gas enclosures are excluded in the cross-section of the composite. In threads which are produced according to the method according to the invention, thus excellent cohesion is provided after crosslinking the resin also in the interior of the thread, since the gluing effect is also provided there to its full extent. Thus, strength is significantly increased and the capability to numerically determine loads is improved.

The invention however is based on the additional finding that using threads with cured resin as well as using twisted threads which do not include resin is not helpful for further processing threads into textile fabrics or semi finished products fabricated there from through adding resin, but an excellent connection of the individual filaments in the textile fabric or semi finished products produced there form is obtained when the linking of the resin is only performed when the threads have been brought into the shape which they shall have in the finished product. Since the threads in the non-crosslinked resin condition according to the invention still have individual filaments which are moveable relative to one another and extend parallel to one another this provides very good contact between the adjacent threads of a structure to be produced there from with the greatest possible contact surfaces. Thus a very far reaching flattening of the threads can be achieved under pressure towards a rectangular cross section which yields flat contact surfaces, for example, between threads crossing over one another. This in turn leads to a particular strength of the manufactured product after crosslinking the resin and substantially reduces resin consumption due to a high portion of individual filaments in the finished product, since the free spaces that are not filled by single filaments are being drastically reduced.

Thus the invention teaches to wait with crosslinking the resin until after one or plural process steps, which are all performed after thread production, the desired final shape of the structure to be produced is reached in order to use the bonding potential of the resin only when an interconnection between a plurality of threads of the individual filaments included therein can be provided in the finished product. Thus, the invention provides a new semi finished product "multi-filament thread with non-crosslinked resin" with a unidirectional orientation of the individual filaments in which the resin after drying performs the essential intermediary task to join the interconnection of individual filaments to form a monofilament thread that can be handled and to maintain this shape during subsequent processing steps. This applies, for example, for subsequent transporting, unwinding, weaving, knitting or fleece production etc. of threads into finished products or semi finished products for producing finished products. From a handling point of view a monofilament thread is provided which however due to the non-crosslinked resin before the subsequent crosslinking process, in particular under pressure loading can be handled, wherein the individual filaments move relative to one another and wherein the compacted form after crosslinking is maintained as final shape of the finished product or semi finished product. The drying of the resin, this means removing the solvent has to be performed at least so that the viscosity of the resin on the one hand side provides cohesion for the individual filaments and on the other hand side prevents that the wound up thread sticks on a spool between adjacent windings or threads and then cannot be correctly spooled off any more for further use.

A particularly simple way of resin coating is to coat the individual filaments through submersion in a resin bath, wherein the individual filaments are preferably pulled through the bath continuously. This provides very even resin application and almost no resin loss occurs through material which may not reach the filaments in alternative coating methods. Also the volumes of such baths can be kept very small which is advantageous for changing the resin material or in case of a stoppage.

It is further proposed according to the invention to use at least one nozzle for compacting the individual filaments, wherein the plurality of the coated individual filaments is pulled through the nozzle. Thus, an inner cavity of the nozzle should be frustum shaped so that superfluous resin is retained in the interior of the nozzle when the compacted single filaments exit from an opening cross section of the nozzle. The nozzle cross section that tapers towards the outlet opening generates dynamic pressure when the individual filaments are moved, wherein the dynamic pressure facilitates good filling of the subsequent cross section with resin, in particular also of the central portion and thus almost completely removes possible gas portions in the subsequent yarn cross section. Preferably the nozzles are in a resin bath.

In a particularly advantageous manner the method according to the invention can be performed with the subsequent filament types:
 a) filaments made from synthetic polymers, in particular made from aramide, preferably made from para-aramide;
 b) filaments made from carbon;
 c) filaments made from glass;
 d) filaments made from minerals, in particular made from basalt; and
 e) filaments made from metal wire, in particular made from steel.

Advantageously the individual filaments should have diameters in a range between 3 μm and 30 μm, advantageously between 4 μm and 20 μm and further advantageously between 6 μm and 10 μm and/or the compacted composite should have a diameter between 3 μm and 30 μm, advantageously between 4 μm and 20 μm and further advantageously between 6 μm and 10 μm and/or the compacted composite should have a diameter in a range between 150 μm and 10 mm, advantageously between 200 μm and 2 mm, particularly advantageously between 250 μm and 1.0 mm and/or the dried monofilament thread should have a diameter in a range between 120 μm and 10 mm, preferably between 160 μm and 1.6 mm, and particularly advantageously between 200 μm and 0.9 mm.

Furthermore the monofilament thread should be assembled from a number of individual filaments within the following ranges 100 to 3000, advantageously 150 to 2000, further advantageously 200 to 1000.

The employed resin can be selected from the group of the following resin types:
 a) Phenolic-formaldehyde resin;
 b) Aminoplastic resin;
 c) Epoxy resin;
 d) Polyester resin;
 e) ABS-resin;
 f) Silicone resin; or
 g) from a mixture of at least two of the preceding resin types.

According to an embodiment of the invention it is proposed that the resin includes a solvent portion, advantageously a water portion, between 10% and 70%, advantageously between 20% and 50%, further advantageously between 30% and 40%.

According to a particularly advantageous embodiment of the method according to the invention the solvent can be driven out of the coated and compacted composite through convection with forced air and/or through electromagnetic radiation, in particular infra red radiation or microwave radiation. Thus the temperature during the drying process should be preferably maintained in a range between 70° C. and 110° C., preferably between 80° C. and 100° C., in order to safely exclude undesirable crosslinking.

In order to improve adhesion of the resin at the individual filaments and to reduce introduction of air into the resin bath the individual filaments before coating with the resin can be heated to a temperature between 50° C. and 80° C., preferably between 60° C. and 70° C.

In order to obtain threads with particular properties and in order to optimize them with respect to plural requirements a first type of individual filaments can be arranged in an inner zone of the compacted composite of the individual filaments while another type of individual filaments is arranged in at least one outer zone that connects to the inner zone in radially outward direction. Optionally a thread of this type which includes a "core" and a "first jacket" can include another "jacket" radially further outside in the form of a second outer zone, wherein another type of individual filaments than in the first outer zone is arranged in the second outer zone. This way threads with optimum properties for various applications can be achieved, for example, for pure strength optimization, wear optimization, fire protection, heat insulation, noise insulation etc. For threads of this type with portions with different types of individual filaments defined relative to one another the boundaries between the respective zones should be formed by cylindrical surfaces which are arranged coaxial to a thread longitudinal axis.

The resin flow during the coating process is improved and thus air enclosures are prevented from remaining in the resin individual filament composite when the individual filaments are cleaned before coating, in particular washed in a bath with a cleaning liquid and/or are provided with a pre-coating that improves resin flow, wherein the particular filaments (45, 46, 47) are advantageously individually supported during cleaning.

The object is achieved by a device for producing a thread which includes a plurality of individual filaments, wherein the device includes the following features:

- at least one feed device for a plurality of individual filaments aligned parallel to one another;
- a coating device through which the individual filaments respectively supported at a distance from one another are coatable at their enveloping surfaces with a flowable resin that includes a solvent and which is crosslinkable under the impact of at least one physical variable and/or one chemical substance;
- a compacting device through which the cross-section filled by the plurality of individual filaments and the adhering resin can be reduced so that an composite can be produced which is made from the particular filaments and the resin continuously enveloping them, wherein the composite is free from gas enclosures;
- a drying device through which the solvent included in the resin is drivable out of the compacted composite; and
- a winding device through which the dried composite can be wound up with minimum tension so that the particular filaments are arranged without twist.

A device of this type facilitates performing the method according to the invention in a particularly simple manner.

Advantageously the coating device includes a container with a resin bath through which the plurality of individual filaments can be run individually.

In order to achieve good compacting results in a simple manner, the compacting device should include at least one nozzle whose cavity is frustum shaped. Advantageously at least the nozzle is arranged in the resin bath.

In order to be able to produce threads with at least two zones with different types of individual filaments and thus to produce threads with combined properties, it is proposed that the compacting device includes an inner nozzle and an outer nozzle arranged coaxial thereto. Between a tip of the inner nozzle and an inner enveloping surface of the outer nozzle which includes a frustum shaped cavity, there is advantageously an annular gap. In this case, a plurality of individual filaments of a first type is configured to be run through an opening cross-section of the inner nozzle and a plurality of individual filaments of a second type is configured to be run through the annular gap between the nozzles. This way, a compacted composite can be generated at an outlet cross-section of the outer nozzle (combination composite) which includes an inner zone made from individual filaments of the first type and an outer zone made from individual filaments of the second type. In order to provide good cohesion of the individual filaments and subsequently high strength of the end product produced, the cavities between all individual filaments of both types are completely filled with resin and all individual filaments of both types extend parallel to another in the combination composite.

For fine tuning of the device during the compacting process, the outer nozzle can be movable in axial direction relative to the inner nozzle and can be fixatable in different positions.

According to the invention, the preferred portion of resin relative to the entire volume of the thread is between 2% and 15%, further preferably between 5% and 12%.

BRIEF DESCRIPTION OF THE DRAWINGS

The invention is subsequently described based on an embodiment of a device for performing the method and based on an embodiment of the thread according to the invention with reference to drawing figures, wherein.

DETAILED DESCRIPTION

Figure 1:
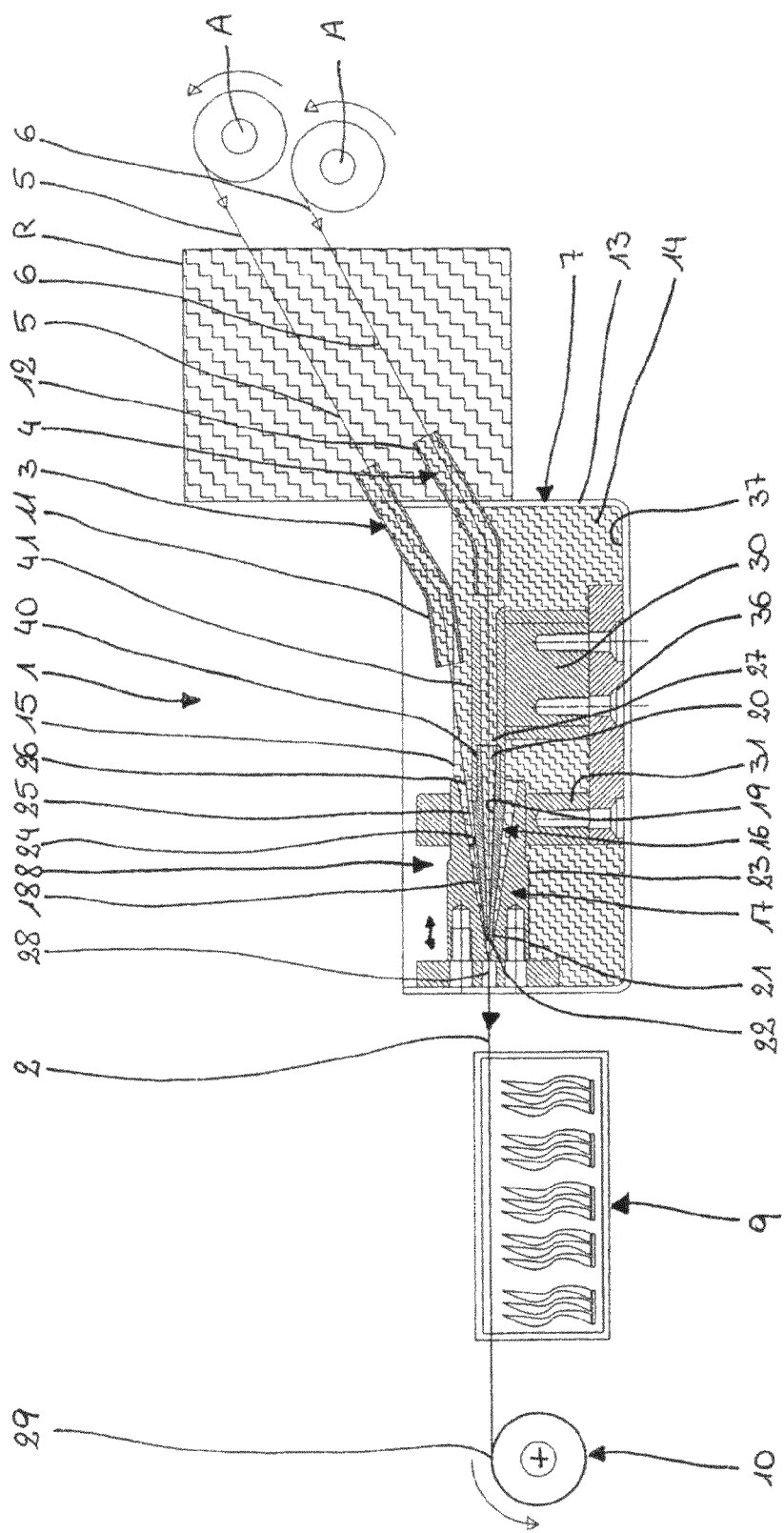
FIG. 1 illustrates a longitudinal sectional view of the device.

A device 1 as illustrated in FIG. 1 for producing a thread 2 includes two unwinding devices A, two feed devices 3 and 4 for feeding respectively a plurality of monofilaments of two different types which are not illustrated individually, but only indicated by the lines 5 and 6, a cleaning device R, a coating device 7, a compacting device 8, a drying device 9 that is only schematically illustrated and eventually a wind-up device 10 for winding up the monofilament thread 2.

The unwinding units facilitate twist-free unwinding of the bundles of individual filaments so that in particular overhead unwinding is excluded.

The two feed devices 3 and 4 are slightly curved tubular elements 11 and 12 through which the individual filaments which are monofilaments are run in individually. The individual filaments are unwound twist-free by another winding device which is not illustrated but known in the art.

Initially the two bundles of monofilaments are run through a bath or a curtain with a cleaning fluid (primer) of a cleaning device R before they are subsequently fed to the coating device after the treatment.

The coating device 7 is formed by a container 13 in which a bath with flowable resin 14 is arranged through which the respective plurality of individual filaments of both types run. Thus, a submersion coating of all individual filaments takes place through a connection that is not illustrated, a level 15 of the resin bath is kept constant, and in particular the continuous consumption of resin during thread coating is compensated.

Figure 2A:
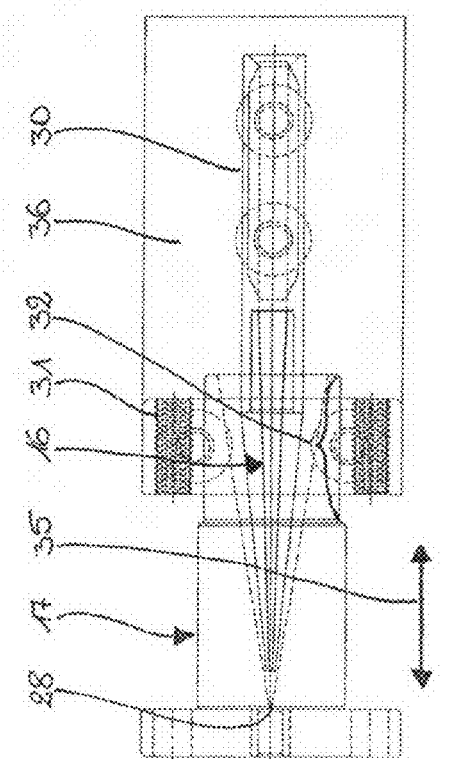
FIG. 2a-2c illustrate a top view, a lateral view and a front view of a compacting device of the device according to FIG. 1.
Figure 2B:
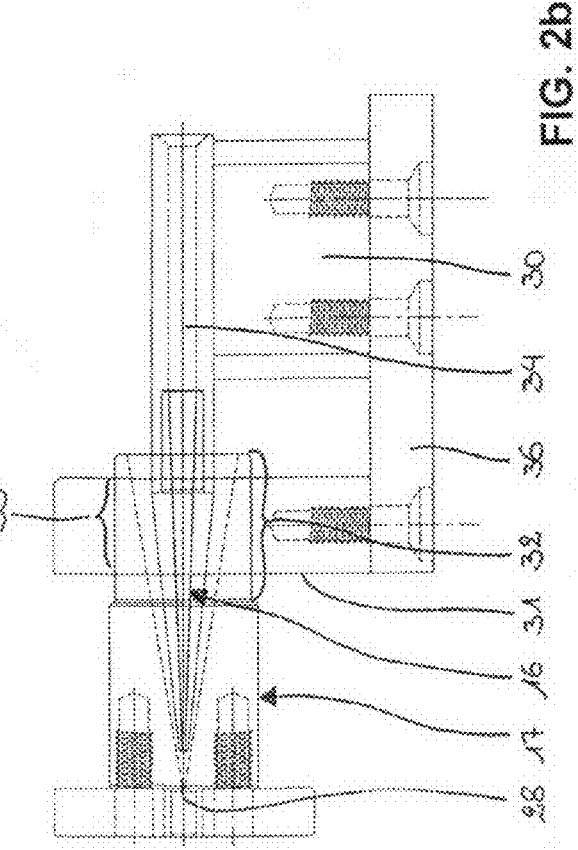
Figure 2C:
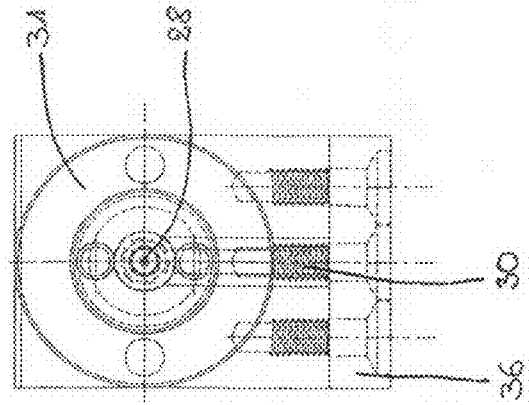
Figure 3B:
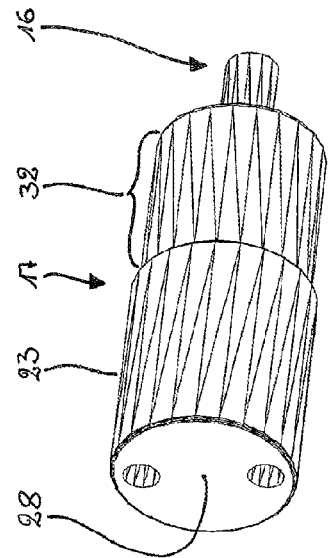
FIGS. 3a and 3b illustrate two perspective views of an outer nozzle with an inserted inner nozzle of the compacting device according to FIG. 2a-2c.
Figure 4B:
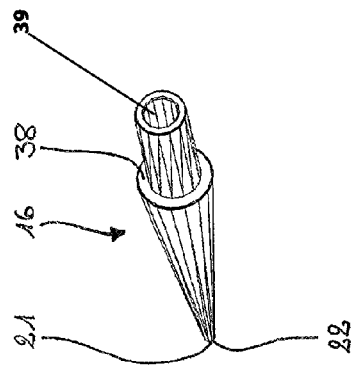
FIGS. 4a and 4b respectively illustrate a view of an exterior nozzle and of an inner nozzle of the compacting device according to FIG. 2a-2c.
Figure 3A:
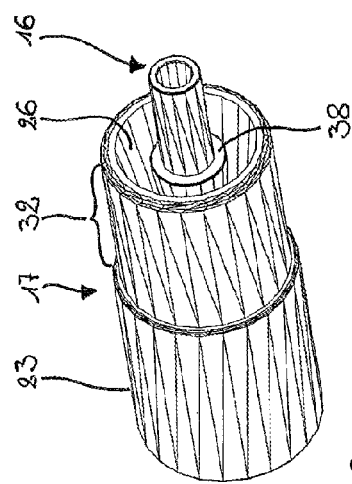
Figure 4A:
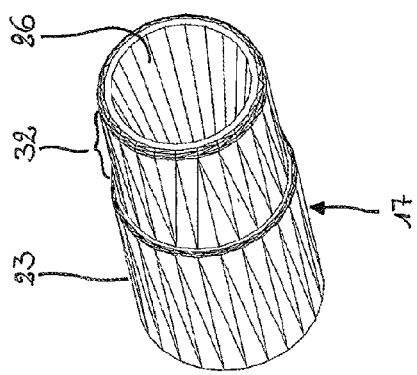

The compacting device 8 which is separately depicted in FIGS. 2a-2c in three views includes an inner nozzle 16 and an outer nozzle 17 arranged coaxial thereto. Both nozzles 16, 17 are illustrated again in detail in different perspective views in FIGS. 3a, 3b and 4a, 4b.

The inner nozzle includes a frustum shaped outer enveloping surface 18 and an inner enveloping surface 19 which has a smaller cone angle. The inner enveloping surface 19 defines an inner cavity 20 of the inner nozzle 16, wherein the compacting, this means the radial compression of the plurality of individual filaments which subsequently produce an inner zone of the thread 2 occurs in the inner cavity 20 up to an opening cross-section 22 arranged at a tip 21 of the inner nozzle 16.

The outer nozzle 17 includes a cylindrical outer enveloping surface 23 with shoulders and a frustum shaped inner enveloping surface, whose cone angle in turn is greater than the cone angle of the outer frustum shaped enveloping surface 18 of the inner nozzle 16. With a continued movement of the individual filament fiber bundles of both types into the inner cavities 20, 25 of both nozzles 16, 17, the respectively effective annular and circular cross-section is continuously reduced starting with the respective inlet cross-sections 26, 27 of the two nozzles 17, 16, which provides the compacting effect for the individual filaments.

At an outlet cross-section 28 of the outer nozzle 17, a monofilament thread 2 is provided at the end of the compacting process, wherein the monofilament thread 2 has a relatively tight arrangement of individual filaments in its cross-section, wherein the intermediary cavities between the individual filaments are completely filled with resin 14 and do not include any gas enclosures at all.

It is important that the individual filaments which subsequently form the outer zone of the thread 2 initially move into the device 1 through the tubular element 11 of the feed device 3 as a fiber bundle with approximately circular cross-section which is subsequently flat and loosened up. In the portion of the annular cavity between the inner nozzle 16 and the outer nozzle 17, viewed in axial direction of the nozzles 16, 17, the outer individual filaments are wound about the outer enveloping surface 18 of the inner nozzle 16 (distribution in circumferential direction). As a result, the outer monofilaments at the latest in the portion of the opening cross-section 22 of the inner nozzle 16 viewed in cross-section form a closed ring which completely envelops the individual filaments which are approximately arranged in a circular shape in cross-section, wherein the individual filaments exit from the nozzle 16 and form the subsequent inner zone of the thread 2.

The exterior cone angle of the inner nozzle 16 is about 1.5° to 2.5°, preferably 2.0°, and the inner cone angle of the inner nozzle 16 is approximately 10° to 15°, preferably approximately 12°. The inner cone angle of the outer nozzle is approximately 15° to 20°, preferably approximately 18°.

In the drying device 9, the monofilament thread 2 formed as described supra is dried using microwaves and/or hot air convection, this means in the present case that the water based solvent for the resin 14 is removed from the resin 14 so that its viscosity increases, the gluing properties and thus the cohesion of the individual filaments is improved. However, a drying is only provided in the physical sense and no chemical crosslinking of the monomers of the resin 14 occurs.

After leaving the drying device 9, the thread 2 is stabilized far enough and thus has no "gluing" properties anymore, so that it can be wound up on the winding device 10 onto corresponding spools 29. It is important for the method according to the invention that the individual filaments, in the present case of both types, are not twisted with one another in any step of the production process. During the entire production method, the parallel, this means unidirectional, orientation of all monofilaments is maintained, which also applies for the "finished" thread 2 wound up on the spool 29.

Based on the FIGS. 1 and 2a through 2c, it is evident that the inner nozzle 16 is attached at a first nozzle support 30. The outer nozzle 17 is attached at a second nozzle support 31 and namely threaded with an outer threaded section 32 into an inner thread section 33 of the nozzle support 31 interacting therewith. This facilitates providing a horizontal movement of the outer nozzle 17 along the double arrow 35 in the course of rotating the outer nozzle 17 about an axis 34. This facilitates adjusting the compacting partners individually. From the figures it can furthermore be derived that both nozzle supports 30, 31 are bolted together with a base plate 36, wherein the base plate 36 is arranged on a base surface 37 of the container 13. The nozzles 16, 17, the nozzle supports 30, 31 and the base plate 36 as well as the connecting bolts are made from stainless steel. The same applies for the container 13 and the tubular elements 11 and 12 of the supply devices 3 and 4.

As can be derived from FIGS. 3a and 3b and 4a and 4b, the inner nozzle 16 includes a tubular rear portion connected to its frustum shaped front portion, wherein the tubular rear portion connects to the front portion at a shoulder 38. The rear portion which has an opening cross-section 39 facilitates inserting a respectively adapted expended borehole cross-section 40 of a tubular nozzle holder 41 into the inner nozzle 16, wherein the nozzle holder 41 in turn is connected with the nozzle support 30.

Through the device 1, a thread 2 can be produced whose circular inner zone includes approximately 100 to 2,000 individual filaments made from carbon. An outer zone with annular cross-section arranged about the inner zone in turn includes 100 to 2,000 individual filaments made, for example, from glass or ceramic. The diameters of both filament types can be in a range between 5 µm and 25 µm, preferably between 8 µm and 20 µm. Advantageously the individual filaments of one type all have identical diameters and also all filament types can have the same diameter.

The resin 14 in the present case is made from a silicon resin mix. The resin "WS 40" distributed by Wacker Chemie AG, Munich, Germany, is suitable in particular.

Crosslinking the silicon resin is performed at a later point in time when the finished thread 2 is unwound from the coil 29 again and processed into a semi-finished product or end product (textile fabric or three dimensional structure) and thus the final configuration of the component is defined. The crosslinking temperature is above 140° C., wherein advantageously a pressure of up to 500 N/mm$^2$ is applied. Finishing the non-crosslinked thread 2 is not an object of the instant application.

Figure 5:
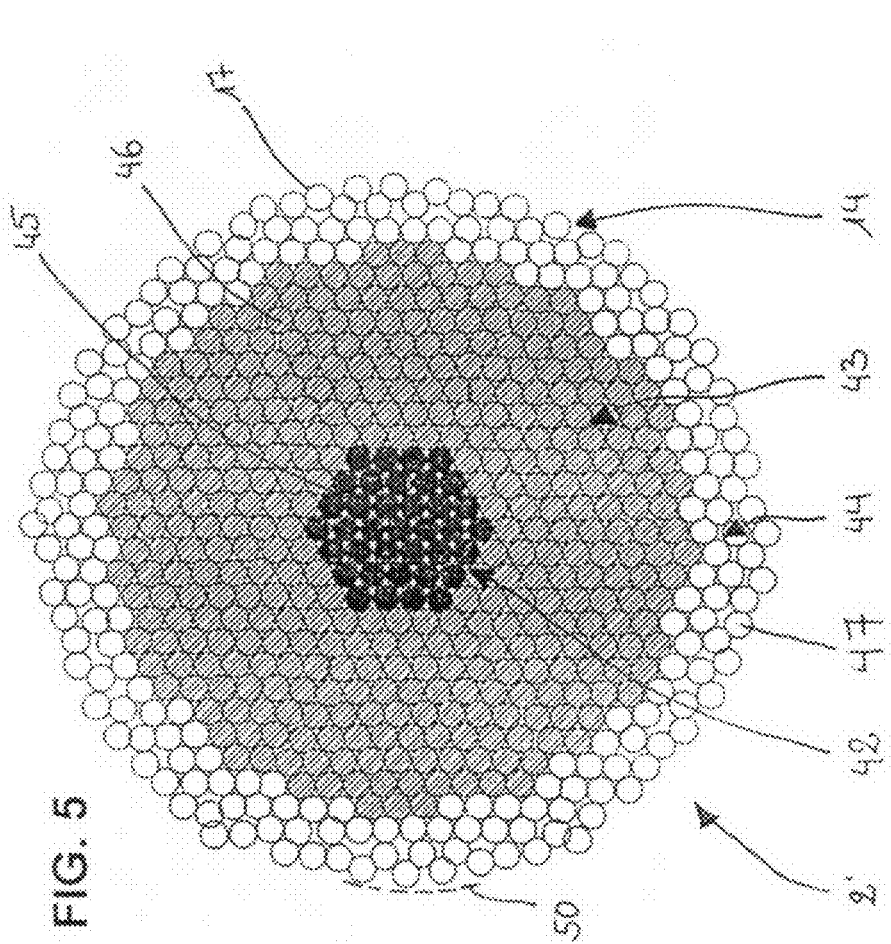
FIG. 5 illustrates a cross-section through a thread with an inner zone and two outer zones.

The alternative thread 2' according to FIG. 5 has a three zone configuration compared to the thread 2 produced by the device 1. An inner zone 42 is enveloped by a first outer zone 43 that is shaped like a circular ring in cross section, wherein the first outer zone in turn is enveloped by the second outer zone 44 in radially outward direction wherein the second outer zone 44 also is shaped by a circular ring in cross section. In the case illustrated in FIG. 5 the individual filaments 45 of the inner zone are formed by carbon fibers, the particular the filaments 46 of the first outer zone 43 are formed basalt and the individual filaments 47 of the second outer zone 44 are formed from silicone. It is appreciated that the illustration of the individual filaments 45 through 47 with reference to the provided number in the respective zone is not to scale. As stated already with reference to the thread 2 as a product of the device 1 advantageously at least approximately 100 individual filaments are provided in the inner zone 42. Accordingly there are typically more individual filaments in the two outer zones 43, 44, this means between approximately 500 and 1500 as a function of the selected layer thicknesses.

Figure 6:
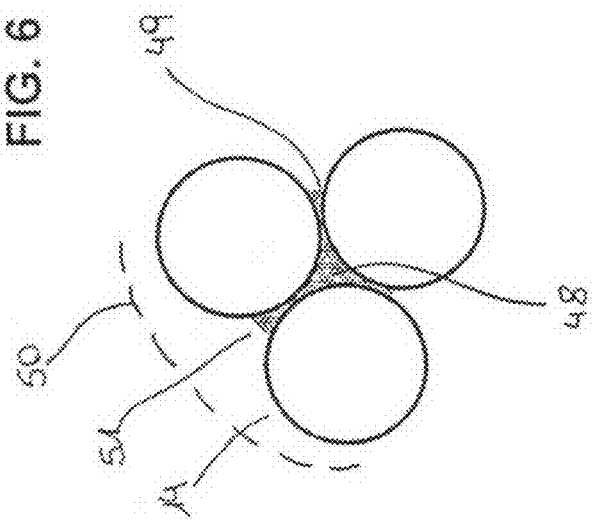
FIG. 6 illustrates an enlarged detail of FIG. 5 with three adjacent individual filaments.

The thread 2' like all threads produced according to the method according to the invention is characterized by very high packing density of the individual filaments 45 through 47 in all three zones. Intermediary spaces 48 which are illustrated in FIG. 6 at three individual filaments 47 which are pointed out in an exemplary manner have a typical spandrel shape (triangular shape with curved sides) in cross-section. In practical applications there are thin intermediary layers made from resin also in the portion of imaginary contact lines 49 or contact surfaces which improves the strength of the composite made from individual filaments 47 and resin for subsequent crosslinking of the resin. For individual filaments 47, which define the thread 2' in outward direction, there is resin 14 also in a portion which is defined by the dashed line 50 about the individual filaments 47 and also in the spandrels 51 formed between adjacent individual filaments 47. Overall, resin consumption is minimized for the method according to the invention or threads 2 and 2'.

Aramide, in particular para-aramide monofilament due to its high price is used in particular when the strength properties or the ratio of strength and mass is important (aerospace and security applications, etc.). Glass fiber is a cost-effective material with sufficient properties. When there are stringent requirements with respect to temperature resistance, ceramic- or basalt-fibers can be used. Abrasion resistant monofilaments are typically used in the outer zone. Monofilaments with high tensile strength are typically used in the inner zone.

REFERENCE NUMERALS AND DESIGNATIONS

1 Device
2, 2' Thread
3 Feed device
4 Feed device
5 Line
6 Line
7 Coating device
8 Compacting device
9 Drying device
10 Winding device
11 Tubular element
12 Tubular element
13 Container
14 Resin
15 Level
16 Inner nozzle
17 Outer nozzle
18 Outer enveloping surface
19 Inner enveloping surface
20 Inner cavity
21 Tip
22 Opening cross-section
23 Outer enveloping surface
24 Inner enveloping surface
25 Inner cavity
26 Inlet cross-section
27 Inlet cross-section
28 Outlet cross-section
29 Spool
30 Nozzle support
31 Nozzle support
32 Outer thread section
33 Inner thread section
34 Axis
35 Double arrow
36 Base plate
37 Ground surface
38 Shoulder
39 Opening cross-section
40 Borehole section
41 Nozzle support
42 Inner zone
43 First outer zone
44 Second outer zone
45 Individual filament
46 Individual filament
47 Individual filament
48 Intermediary space
49 Contact line
50 Line
51 Spandrel
R Cleaning device

What is claimed is:

1. A device for producing a thread which includes a plurality of individual filaments, comprising:
    at least one feed device for the plurality of individual filaments aligned parallel to one another;
    a coating device through which the individual filaments are coatable at their respective enveloping surfaces with a flowable resin that includes a solvent and which is crosslinkable under an impact of at least one physical variable or one chemical substance;
    a compacting device through which the cross-section filled by the plurality of individual filaments and the adhering resin is reducible so that a composite is producible which is made from the individual filaments and the resin continuously enveloping them, wherein the composite is free of gas enclosures;
    a drying device through which the solvent included in the resin is expellable from the compacted composite; and
    a winding device through which the dried composite is upwindable with minimum tension so that the individual filaments are arranged without a twist,
    wherein the compacting device includes at least one nozzle whose inner cavity is frustum shaped,
    wherein the compacting device includes an inner nozzle and an outer nozzle arranged coaxial to the inner nozzle and an annular gap is arranged between a tip of the inner nozzle and an inner enveloping surface of the outer nozzle which includes a frustum shaped cavity,
    wherein a plurality of individual filaments of a first type is configured to be run through an opening cross-section of the inner nozzle and a plurality of individual filaments of a second type is configured to be run through the annular gap between the nozzles, so that a compacted composite is producible at an outlet cross-section of the outer nozzle,
    wherein the compacted composite includes an inner zone made from individual filaments of the first type and an outer zone made from individual filaments of the second type, and
    wherein cavities between all individual filaments of both types are completely filled with the resin and all individual filaments of both types extend parallel to another.

2. The device according to claim 1, wherein the outer nozzle is movable in axial direction relative to the inner nozzle and fixatable in different positions.

3. A device for producing a thread which includes a plurality of individual filaments, comprising:
    at least one feed device for the plurality of individual filaments aligned parallel to one another;
    a coating device through which the individual filaments are coatable at their respective enveloping surfaces with a flowable resin that includes a solvent and which is crosslinkable under an impact of at least one physical variable or one chemical substance;

a compacting device through which the cross-section filled by the plurality of individual filaments and the adhering resin is reducible so that a composite is producible which is made from the individual filaments and the resin continuously enveloping them, wherein the composite is free of gas enclosures;

a drying device through which the solvent included in the resin is expellable from the compacted composite; and a winding device through which the dried composite is upwindable with minimum tension so that the individual filaments are arranged without a twist, wherein the compacting device includes at least one nozzle whose inner cavity is frustum shaped, wherein the compacting device includes an inner nozzle and an outer nozzle arranged coaxial to the inner nozzle and an annular gap is arranged between a tip of the inner nozzle and an inner enveloping surface of the outer nozzle which includes a frustum shaped cavity, wherein a plurality of individual filaments is configured to be run through an opening cross-section of the inner nozzle and a plurality of individual filaments is configured to be run through the annular gap between the nozzles, so that a compacted composite is producible at an outlet cross-section of the outer nozzle, wherein the compacted composite includes an inner zone made from individual filaments and an outer zone made from individual filaments, and wherein cavities between all individual filaments are completely filled with the resin and all individual filaments extend parallel to another.

4. The device according to claim 3, wherein the outer nozzle is movable in axial direction relative to the inner nozzle and fixatable in different positions.

5. The device according to claim 3,
wherein the individual filaments are coated through submersion in a bath of the resin, and
wherein the individual filaments are pulled through the bath continuously.

6. The device according to claim 3,
wherein the compacting is performed in a nozzle through which the plurality of coated individual filaments is pulled, and
wherein an inner cavity of the nozzle is frustum shaped so that superfluous resin is retained in the inner cavity of the nozzle when the compacted individual filaments exit from an outlet cross-section of the nozzle.

7. The device according to claim 3, wherein the individual filaments are selected from:
filaments made from synthetic polymers,
filaments made from aramide,
filaments made from carbon,
filaments made from glass,
filaments made from minerals,
filaments made from basalt,
filaments made from metal wire, or
filaments made from steel wire.

8. The device according to claim 3,
wherein the individual filaments have a diameter in a range between 3 µm and 30 µm, or
wherein the compacted composite has a diameter in a range between 150 µm and 10 mm, or
wherein the dried monofilament thread has a diameter in a range between 120µm and 10 mm.

9. The device according to claim 3, wherein the monofilament thread is assembled from 100 to 3000 individual filaments.

10. The device according to claim 3, wherein the resin is selected from a group consisting of phenolic-formaldehyde resin, aminoplastic resin, epoxy resin, polyester resin, ABS-resin, silicone resin and from a mixture of at least two of the resins.

11. The device according to claim 3, wherein the resin includes a solvent portion, between 10% and 70% before drying.

12. The device according to claim 3,
wherein the solvent is driven out of the coated and compacted composite through convection with forced air or through electromagnetic radiation, and
wherein a temperature during the drying process is maintained in a range between 70° C. and 110° C.

13. The method according to claim 3, wherein the individual filaments are heated to a temperature between 50° C. and 80° C. before being coated with the resin.

14. The device according to claim 3, wherein boundaries between the zones are formed by cylindrical surfaces which are arranged coaxial to a thread longitudinal axis.

15. The device according to claim 3,
wherein the individual filaments are cleaned before or provided with a pre-coating improving resin flow, and
wherein the individual filaments are supported individually during cleaning.

16. The device according to claim 3, wherein the coating device includes a container with a resin bath through which the plurality of individual filaments is runable individually.

17. The device according to claim 1,
wherein the individual filaments are coated through submersion in a bath of the resin, and
wherein the individual filaments are pulled through the bath continuously.

18. The device according to claim 1,
wherein the compacting is performed in a nozzle through which the plurality of coated individual filaments is pulled, and
wherein an inner cavity of the nozzle is frustum shaped so that superfluous resin is retained in the inner cavity of the nozzle when the compacted individual filaments exit from an outlet cross-section of the nozzle.

19. The device according to claim 1, wherein the individual filaments are selected from:
filaments made from synthetic polymers,
filaments made from aramide,
filaments made from carbon,
filaments made from glass,
filaments made from minerals,
filaments made from basalt,
filaments made from metal wire, or
filaments made from steel wire.

20. The device according to claim 1,
wherein the individual filaments have a diameter in a range between 3 µm and 30µm, or
wherein the compacted composite has a diameter in a range between 150 µm and 10 mm, or
wherein the dried monofilament thread has a diameter in a range between 120µm and 10 mm.

* * * * *